(12) United States Patent
Fuchs

(10) Patent No.: US 11,570,970 B2
(45) Date of Patent: Feb. 7, 2023

(54) DOG COOLING SYSTEM

(71) Applicant: Maranda Enterprises, Mequon, WI (US)

(72) Inventor: Dawn Fuchs, Mequon, WI (US)

(73) Assignee: MARANDA ENTERPRISES, Mequon, WI (US)

( * ) Notice: Subject to any disclaimer, the term of this patent is extended or adjusted under 35 U.S.C. 154(b) by 0 days.

(21) Appl. No.: 16/160,054

(22) Filed: Oct. 15, 2018

(65) Prior Publication Data

US 2019/0110440 A1    Apr. 18, 2019

Related U.S. Application Data

(60) Provisional application No. 62/571,983, filed on Oct. 13, 2017.

(51) Int. Cl.
| | | |
|---|---|---|
| *A01K 27/00* | (2006.01) | |
| *B32B 5/02* | (2006.01) | |
| *B32B 5/26* | (2006.01) | |
| *B32B 3/06* | (2006.01) | |
| *B32B 27/12* | (2006.01) | |

(52) U.S. Cl.
CPC .......... *A01K 27/008* (2013.01); *A01K 27/001* (2013.01); *A01K 27/002* (2013.01); *B32B 3/06* (2013.01); *B32B 5/024* (2013.01); *B32B 5/028* (2013.01); *B32B 5/26* (2013.01); *B32B 27/12* (2013.01); *B32B 2307/30* (2013.01)

(58) Field of Classification Search
CPC .... A01K 27/00; A01K 27/001; A01K 27/002; A01K 27/008; A01K 23/00; A01K 13/00

USPC ........................................................ 119/850
See application file for complete search history.

(56) References Cited

U.S. PATENT DOCUMENTS

| | | | | |
|---|---|---|---|---|
| 2,608,636 A | * | 8/1952 | Albora | H05B 3/342 219/211 |
| 2,690,565 A | * | 10/1954 | Cornet | A41D 1/04 2/108 |
| 4,064,835 A | | 12/1977 | Rabenbauer | |
| 4,227,264 A | * | 10/1980 | Spector | A41D 15/00 2/84 |

(Continued)

FOREIGN PATENT DOCUMENTS

| | | |
|---|---|---|
| CN | 101305877 | 11/2008 |
| CN | 201452402 | 5/2010 |

*Primary Examiner* — Ebony E Evans
(74) *Attorney, Agent, or Firm* — Joseph T. Miotke; Elizabeth L. Neal; DeWitt LLP

(57) ABSTRACT

The present invention is an animal cooling system including a collar removably connected to a vest. The collar may be affixed around an animal's neck and the vest around the animal's torso. The collar includes a fabric layer having at least one pouch affixed to an inner side, at least one coolant sheet removably located within the pouch, and a fastener affixed to the fabric layer. The vest includes a fabric layer having at least one pouch affixed to an inner side, at least one coolant sheet removably located within the pouch, and a fastener affixed to the fabric layer. The coolant sheets include a freezable, non-toxic coolant and once melted, may be removed from their respective pouches and swapped for fresh, frozen coolant sheets to allow for continuous cooling. The system may also be utilized as a separate collar or a separate vest having the same construction and function.

16 Claims, 5 Drawing Sheets

(56) References Cited

U.S. PATENT DOCUMENTS

| | | | | |
|---|---|---|---|---|
| 4,320,538 | A * | 3/1982 | Saft | A41D 15/007 |
| | | | | 2/102 |
| D281,028 | S * | 10/1985 | Nichols | D30/145 |
| 5,072,455 | A * | 12/1991 | St. Ours | A41D 13/0055 |
| | | | | 2/81 |
| 5,537,954 | A * | 7/1996 | Beeghly | A01K 13/006 |
| | | | | 119/850 |
| 5,769,030 | A * | 6/1998 | Acoff | A01K 27/006 |
| | | | | 119/712 |
| 6,128,795 | A | 10/2000 | Stanley et al. | |
| 6,132,455 | A | 10/2000 | Shang | |
| 6,210,427 | B1 | 4/2001 | Augustine et al. | |
| 6,482,332 | B1 | 11/2002 | Malach | |
| 6,571,745 | B2 * | 6/2003 | Kerrigan | A01K 13/006 |
| | | | | 119/792 |
| 6,880,489 | B2 * | 4/2005 | Hartmann | A61D 9/00 |
| | | | | 119/856 |
| 7,036,162 | B1 | 5/2006 | Gatten | |
| 7,107,940 | B2 * | 9/2006 | Abinanti | A01K 27/002 |
| | | | | 119/792 |
| 7,281,363 | B2 * | 10/2007 | Woerner | A01K 27/002 |
| | | | | 119/858 |
| 7,324,340 | B2 | 1/2008 | Xiong | |
| 8,047,410 | B2 * | 11/2011 | Holm | A47F 5/0006 |
| | | | | 223/85 |
| 8,171,891 | B2 * | 5/2012 | Rubinstein | A01K 27/002 |
| | | | | 119/725 |
| 8,434,163 | B1 * | 5/2013 | Nudo | A41D 13/0051 |
| | | | | 2/102 |
| 8,459,212 | B2 * | 6/2013 | Meisenbach | A01K 27/003 |
| | | | | 119/856 |
| 8,556,337 | B1 * | 10/2013 | Cornitius-Cary | A47C 7/746 |
| | | | | 297/188.2 |
| 8,627,788 | B2 * | 1/2014 | Sebo | A01K 27/006 |
| | | | | 54/79.2 |
| 8,720,218 | B2 | 5/2014 | Prendergast | |
| 9,226,474 | B2 | 1/2016 | Prendergast | |
| 9,370,166 | B1 * | 6/2016 | Ford | A01K 27/002 |
| 9,717,287 | B2 * | 8/2017 | DiBernardo | A41D 1/04 |
| 9,795,117 | B1 * | 10/2017 | Grant | A01K 27/001 |
| 10,660,791 | B2 * | 5/2020 | Zakai | A61F 7/10 |
| 2005/0284416 | A1 * | 12/2005 | Smit | A01K 13/006 |
| | | | | 119/850 |
| 2007/0204808 | A1 * | 9/2007 | Harada | A01K 13/006 |
| | | | | 119/850 |
| 2008/0201818 | A1 * | 8/2008 | Nilforushan | A61F 7/02 |
| | | | | 2/69 |
| 2009/0132013 | A1 | 5/2009 | Amalfi | |
| 2009/0222970 | A1 * | 9/2009 | Coleman | A41B 7/04 |
| | | | | 2/108 |
| 2010/0050958 | A1 * | 3/2010 | Jackson | A01K 13/008 |
| | | | | 119/850 |
| 2012/0074183 | A1 * | 3/2012 | Goodman | A63B 71/081 |
| | | | | 224/191 |
| 2015/0007528 | A1 * | 1/2015 | Landrith | A61F 7/02 |
| | | | | 54/68 |
| 2016/0157589 | A1 * | 6/2016 | Austin | A01K 27/008 |
| | | | | 224/258 |
| 2017/0156295 | A1 * | 6/2017 | Zoltanski | A01K 23/00 |
| 2017/0303607 | A1 * | 10/2017 | Iser | A41D 1/04 |
| 2019/0069513 | A1 * | 3/2019 | Bevis | A01K 13/006 |

* cited by examiner

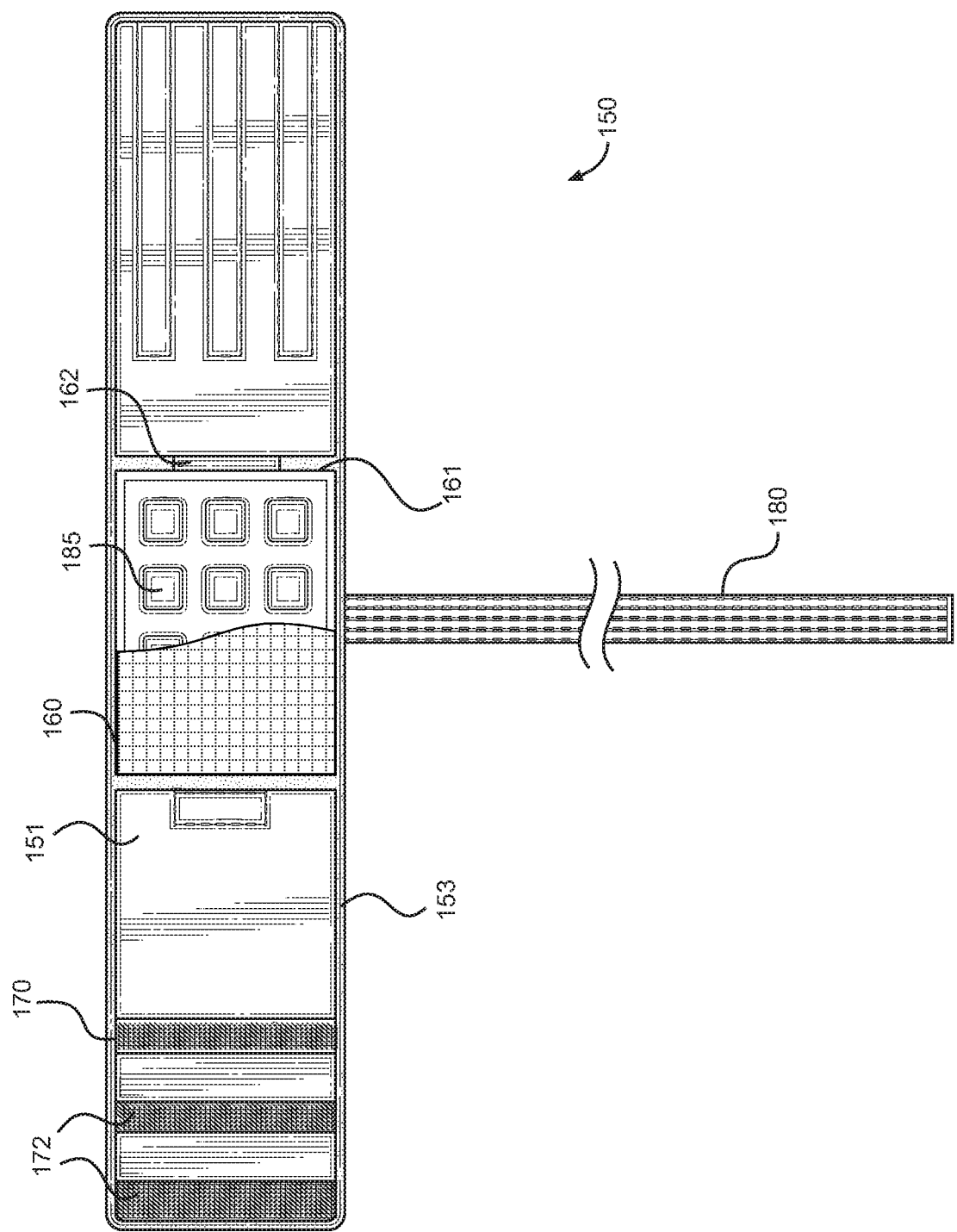

DOG COOLING SYSTEM

CROSS-REFERENCES TO RELATED APPLICATIONS

This application claims the benefit of prior-filed, U.S. Provisional Patent Applications Nos. 62/571,983, filed on Oct. 13, 2017 and 62/594,258, filed on Dec. 4, 2017, the contents of which are incorporated herein by reference in their entirety.

BACKGROUND OF THE INVENTION

The present invention relates to a protective covering for an animal, and more specifically, to a cooling system for an animal such as a dog.

Dogs are extremely sensitive to heat due to their size, lack of sweat glands, and often thick fur coats. A dog outside on a hot day can quickly overheat, going from a normal body temperature of 101 degrees to a hyperthermic 104 degrees in only a few minutes of exercise. Dogs with stocky bodies heat up faster and cool down slower, as do small breeds and brachycephalic breeds (e.g. pugs and bulldogs). News networks are replete with stories of dogs left in cars or outside on hot days who overheated and died. In 2012, a beloved bulldog college mascot died of heatstroke during an outside excursion in triple-digit temperatures. In the aftermath of a 2016 earthquake, a search and rescue dog died of heatstroke after rescuing seven people from a collapsed building.

Unfortunately, many dogs require daily exercise or trips outside to eliminate waste. Even short excursions in high temperatures can be harmful, especially for elderly or infirm dogs. If air conditioning breaks down or is unavailable, immersion in cold water may be the only way to cool down a dog, which can be problematic if one lacks a cool water source. Working dogs, such as explosive- and contraband-detecting dogs, members of law enforcement and military K9 units, guard dogs, service dogs, search and rescue dogs, and others often do not have the luxury of waiting for temperatures to cool before venturing outside. Working dogs must frequently venture into areas far from cool water or air conditioning, and may be required to exert themselves over long distances.

Some protective coverings for dogs utilize evaporative cooling of water to cool dogs. Sadly, if the ambient humidity level is too high, such coverings can actually transfer heat to the dog, making the problem worse. The constant moisture can also cause skin irritation. Other protective coverings apply a gel pack to the torso or neck of a dog. Unfortunately, the gel may not be an effective cooling means; furthermore, if the dog detaches and chews open the gel pack (an unfortunately common scenario), the gel can cause illness if ingested. Other cooling system merely tie or slide in place and are ineffective or uncomfortable for active dogs.

The present invention provides a non-toxic, thermally effective means of cooling a dog, regardless of activity level.

BRIEF SUMMARY

The present system for cooling an animal includes a collar apparatus removably connected to a vest apparatus. The collar includes a collar fabric layer having at least one collar pouch affixed to an inner side thereof, at least one collar coolant sheet removably located within the at least one collar pouch, and a collar fastener affixed to the collar fabric layer. The vest includes a vest fabric layer having at least one vest pouch affixed to an inner side thereof, at least one vest coolant sheet removably located within the at least one vest pouch, and a vest fastener affixed to the vest fabric layer.

The above-referenced system may also be utilized as a separate collar apparatus or a separate vest apparatus having the same construction.

BRIEF DESCRIPTION OF THE DRAWINGS

FIGS. 3a, 3b, and 3c illustrate aspects of a vest for use in the dog cooling system.

DETAILED DESCRIPTION OF THE INVENTION

In the present description, certain terms have been used for brevity, clearness and understanding. No unnecessary limitations are to be applied therefrom beyond the requirement of the prior art because such terms are used for descriptive purposes only and are intended to be broadly construed. The different systems and methods described herein may be used alone or in combination with other systems and methods. Various equivalents, alternatives and modifications are possible within the scope of the appended claims. Each limitation in the appended claims is intended to invoke interpretation under 35 U.S.C. § 112, sixth paragraph, only if the terms "means for" or "step for" are explicitly recited in the respective limitation.

Figure 1:
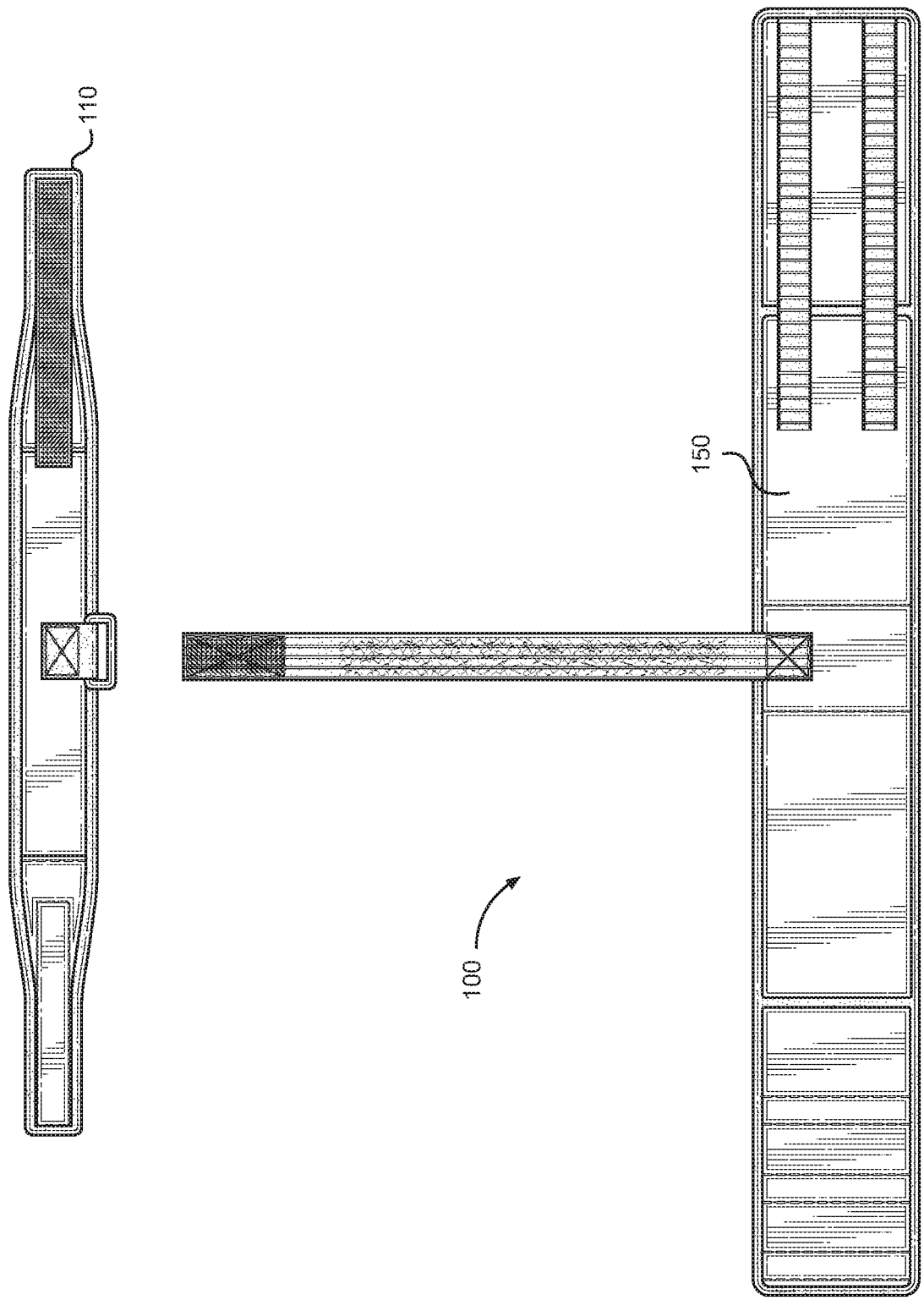
FIG. 1 illustrates an aspect of a dog cooling system.

FIG. 1 illustrates one aspect of a dog cooling system 100. Dog cooling system 100 may include a cooling collar 110 removably connected to a cooling vest 150. Collar 110 typically holds at least one collar coolant sheet 145 around a dog's neck. Vest 150 typically holds at least one vest coolant sheet 185 against the torso of a dog. While collar 110 and vest 150 are usually categorized and sold together for an extra-large, large, medium, small, or extra-small dog, dogs with a significant size difference between the chest and neck may have, by way of non-limiting example, a medium collar 110 and small vest 150. Collars 110 and vests 150 of differing size may still be configured to be used together. In certain aspects only one of either collar 110 or vest 150 is applied to the dog.

Figure 2:
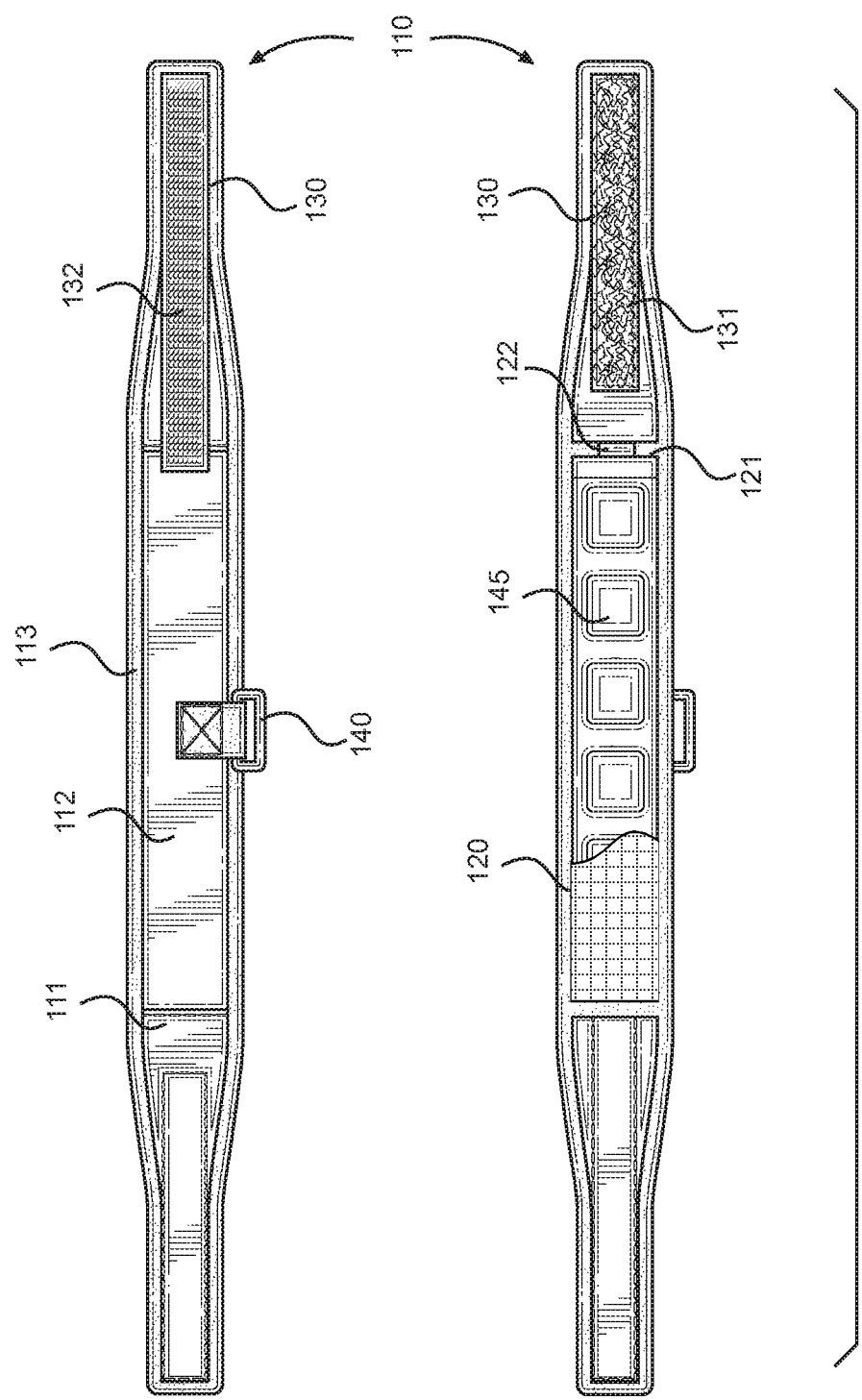
FIG. 2 illustrates an aspect of a collar for use in the dog cooling system.

FIG. 2 illustrates one aspect of collar 110. The base layer of collar 110 is a collar fabric layer 111 to which all other layers are attached. Collar fabric layer 111 may be a washable synthetic fabric. In one aspect, collar fabric layer 111 is a ripstop nylon material. A collar insulation layer 112 can be connected to collar fabric layer 111 to reduce entry of heat from the environment. Collar insulation layer 112 usually only extends along the area of collar fabric layer 111 covered by collar coolant sheet 145 to ensure that the dog's rising core body temperature is not retained. In one aspect, collar insulation layer 112 is an insulating synthetic material, such as, but not limited to, a polychloroprene sheet. Other aspects may use polyethylene foam, nitrile butadiene rubber (NBR), ethylene-vinyl acetate foam, or another insulating foam. Collar trim 113 can finish the various layers, covering the edges of the various layers of material to prevent unraveling and increasing comfort for the dog. In one aspect, collar trim 113 is a woven synthetic material sewn to the periphery of the various layers of collar 110.

A collar pouch 120 may removably hold collar coolant sheet 145 against the neck of the dog. Collar pouch 120 (shown partially cut away in FIG. 2) can be formed from a mesh fabric attached to an inner side of collar fabric layer 111 on three sides. In one aspect, the mesh fabric is a synthetic mesh fabric with stretch along at least one axis, preferably the vertical axis, attached to the collar fabric layer 111 by sewing. An open collar pouch end 121, closed by means of a pouch fastener 122, generally allows insertion and removal of collar coolant sheet 145. Collar pouch 120 can prevent direct contact between the dog's skin and collar coolant sheet 145, preventing potential thermal injury. In one aspect, pouch fastener 122 is a hook-and-loop fastener or fasteners. In other aspects, pouch fastener 122 may be a zipper or snap fastener or fasteners. Collar insulation layer 112 can extend along the outer side of collar fabric layer 111 opposite collar pouch 120 or on an inner side of collar fabric layer 111 between collar fabric layer 111 and collar pouch 120.

Collar coolant sheet 145 is typically a polymeric backing layer and a polymeric top layer forming "cells" of freezable coolant encapsulated in rows and columns. The coolant typically used is water, due to water's non-toxicity and phase change profile, which provides a high heat sink capacity and rapid cooling rate without concomitant thermal shock. Other coolants with similar phase change profiles may also be used. The size of collar coolant sheet 145 can range from 1×2 cells to 2×7 cells depending on the size of collar 110, though larger and smaller collar coolant sheets 145 are contemplated. Various aspects may include multiple smaller collar coolant sheets 145 instead of a single larger collar coolant sheet 145.

Collar 110 can be looped around the dog's neck and held in place by a collar fastener 130. In one aspect, collar fastener 130 is a hook-and-loop fastener with a collar loop fastener 131 on one side and end of collar fabric layer 111 and a collar hook fastener 132 on the opposite side and end of collar fabric layer 111. Either collar loop fastener 131 or collar hook fastener 132 may be on the outer side of collar fabric layer 111. In other aspects, collar fastener 130 may be a snap fastener or fasteners. A vest connector 140 in the form of a closed loop may be attached to collar 110 to allow a connection to vest 150 and keep vest 150 fitting high on the underside of the dog in order to apply cooling to the appropriate places on the underside of the dog.

Figure 3A:
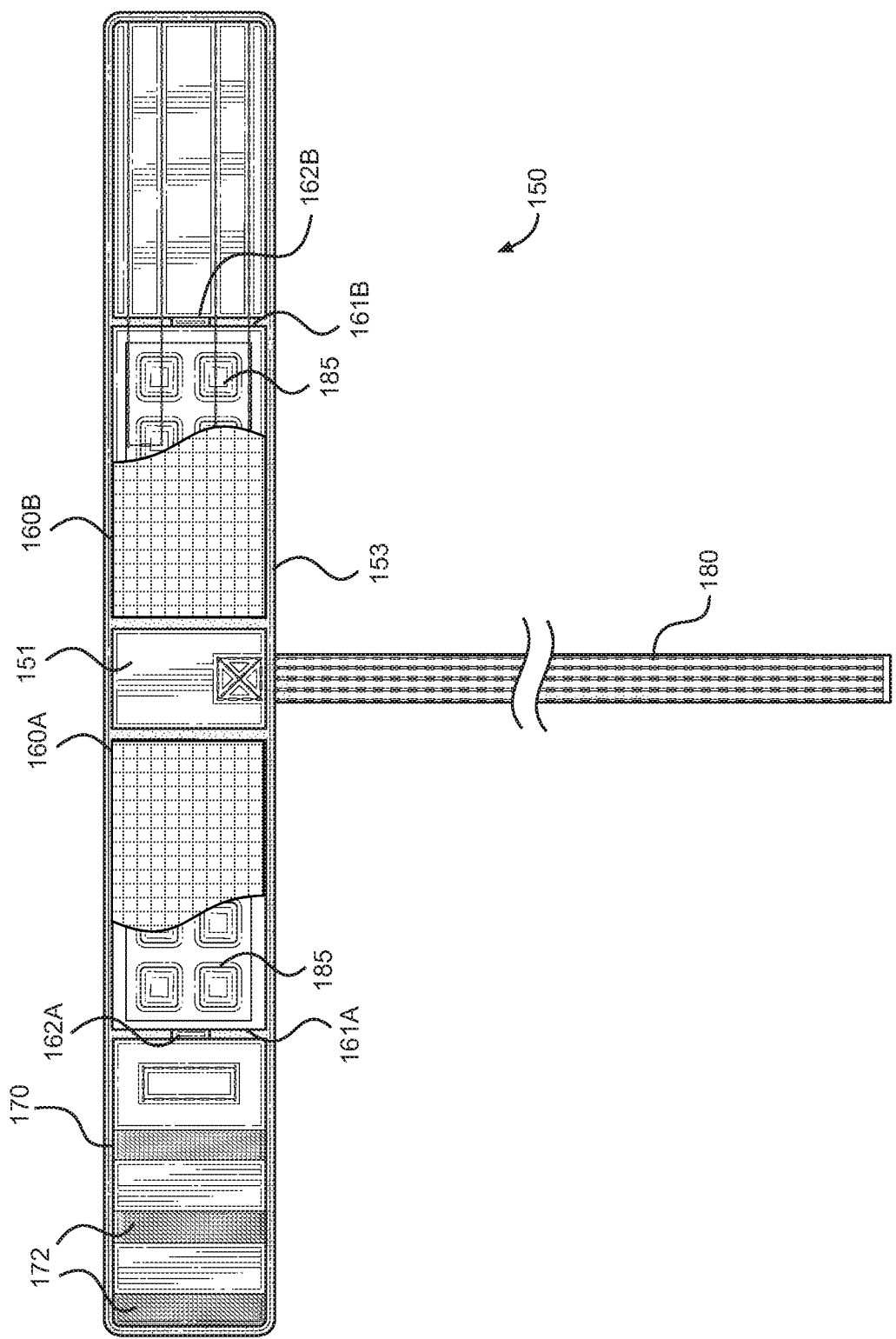
Figure 3C:
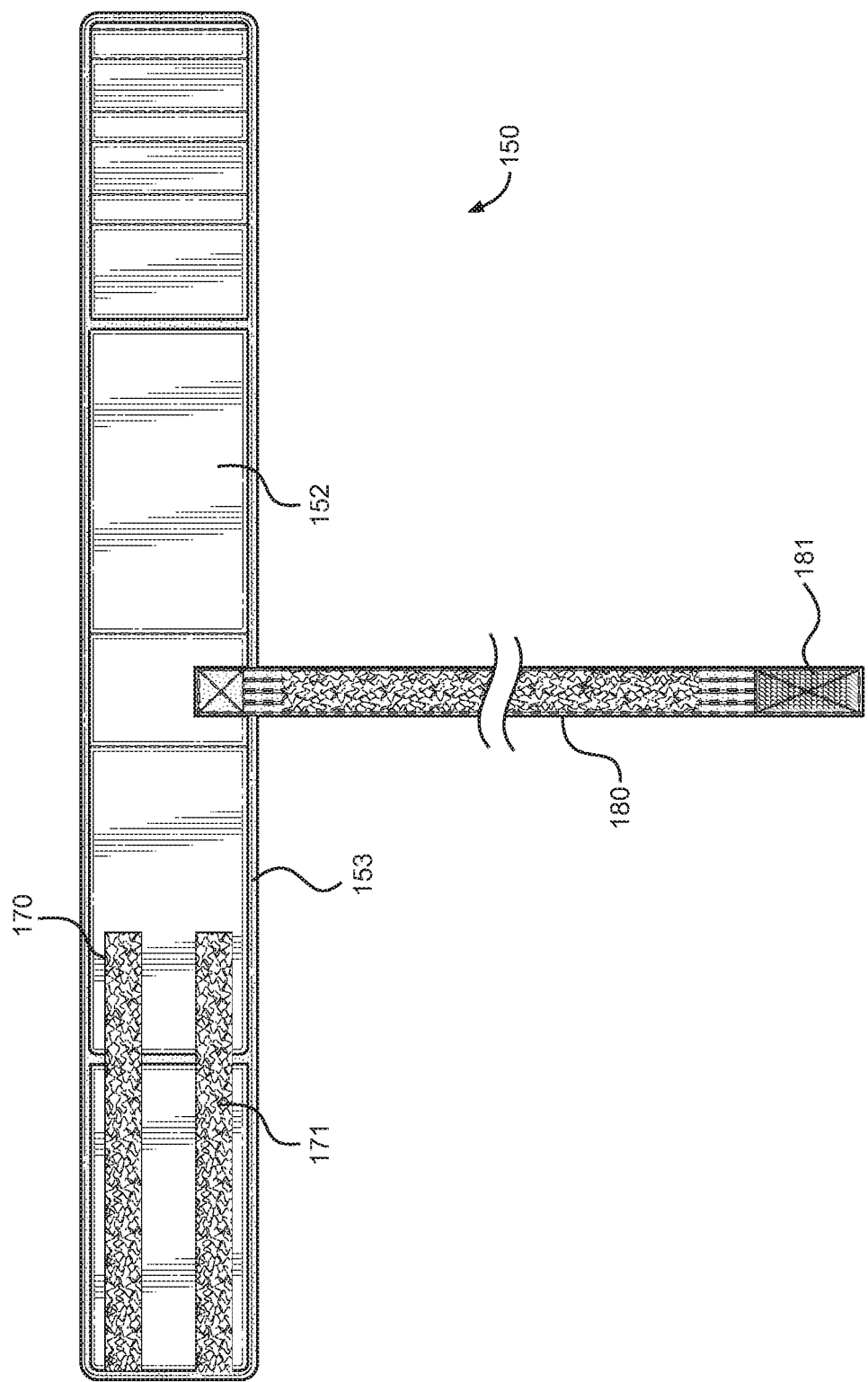

FIGS. 3a, 3b, and 3c illustrate various aspects of vest 150. The base layer of vest 150 is a vest fabric layer 151 to which all other layers are attached. Vest fabric layer 151 can be a washable synthetic fabric. In one aspect, vest fabric layer 151 is a ripstop nylon material. In certain aspects, all or portions of vest fabric layer 151 are elasticized. A vest insulation layer 152 can be connected to vest fabric layer 151 to reduce entry of heat from the environment. Vest insulation layer 152 usually only extends along the area of vest fabric layer 151 covered by vest coolant sheet 185 to ensure that the dog's rising core body temperature is not retained. In one aspect, vest insulation layer 152 is an insulating synthetic material, such as, but not limited to, a polychloroprene sheet. Other aspects may use polyethylene foam, NBR, ethylene-vinyl acetate foam, or another insulating foam. Vest trim 153 can finish the various layers, covering the edges of the various layers of material to prevent unraveling and increasing comfort for the dog. In one aspect, vest trim 153 is a woven synthetic material sewn to the periphery of the various layers of vest 150. In certain aspects, all or portions of vest trim 153 are elasticized.

At least one vest pouch 160 typically holds vest coolant sheet 185 against the torso of the dog, especially the underside of the torso. Certain aspects of vest 150 can include at least two vest pouches 160a and 160b. Vest pouch 160 (shown partially cut away in FIGS. 3a and 3b) may be formed from a mesh fabric attached to an inner side of vest fabric layer 151 on three sides. In one aspect, the mesh fabric is a synthetic mesh fabric with stretch along at least one axis, preferably the vertical axis, attached to the vest fabric layer 151 by sewing. An open vest pouch end 161, closed by means of a pouch fastener 162, can allow insertion and removal of vest coolant sheet 185. Vest pouch 160 can prevent direct contact between the dog's skin and vest coolant sheet 185, preventing potential thermal injury. In one aspect, pouch fastener 162 is a hook-and-loop fastener. In other aspects, pouch fastener 162 may be a zipper or snap fastener or fasteners. Vest insulation layer 152 can extend along the outer side of vest fabric layer 151 opposite vest pouch 160 or on an inner side of vest fabric layer 151 between vest fabric layer 151 and vest pouch 160.

Vest coolant sheet 185 typically has the same construction as collar coolant sheet 145. The size of vest coolant sheet 185 ranges from 1×4 cells to 4×10 cells depending on the size of vest 150, though larger and smaller vest coolant sheets 185 are contemplated. Various aspects may include multiple smaller vest coolant sheets 185 instead of a single larger vest coolant sheet 185.

Vest 150 typically extends around the dog's torso and is held in place by a vest fastener 170 in order to apply cooling to the appropriate places on the underside of the dog. Vest fastener 170 may be a hook-and-loop fastener with at least one vest loop fastener 171 on one side and end of vest fabric layer 151 and at least one vest hook fastener 172 on the opposite side and end of vest fabric layer 151. Either vest loop fastener 171 or vest hook fastener 172 can be on the outer side of vest fabric layer 151. The number of vest loop fasteners 171 and vest hook fasteners 172 may vary by the size of vest 150; a large vest 150 may have 2-4 vest loop fasteners 171 and vest hook fasteners 172, while an extra-small vest 150 only has a single pair of vest loop fastener 171 and vest hook fastener 172. The number of vest loop fasteners 171 need not match the number of vest hook fasteners 172. In certain aspects, vest loop fastener(s) 171 and vest hook fastener(s) 172 extend at right angles to each other, with one of vest loop fastener(s) 171 or vest hook fastener(s) 172 extending horizontally across vest 150 and the other extending vertically.

A collar connector 180 may be attached to the outer surface of vest insulation layer 152 to provide a connection to the vest connector 140 of collar 110. Collar connector 180 is typically an elastic strip of material covered with loops on one side. A connector hook fastener 181 can be located at the distal end, on the same side as the loops. To connect vest 150 to collar 110, a user may insert connector hook fastener 181 through vest connector 140, then double connector hook fastener 181 back to connect it with the loops on collar connector 180.

It should be understood that while the description refers to a system for a dog, the system may be modified to accommodate any animal having a neck and/or chest, with corresponding changes in the sizes of collar coolant sheet 145 and vest coolant sheet 185.

In the foregoing description, certain terms have been used for brevity, clearness, and understanding. No unnecessary limitations are to be inferred therefrom beyond the requirement of the prior art because such terms are used for descriptive purposes and are intended to be broadly construed. Any different configurations, systems, and method steps described herein may be used alone or in combination with other configurations, systems, and method steps. It is to be expected that various equivalents, alternatives, and modifications are possible within the scope of the appended claims.

What is claimed is:

1. A system for cooling an animal, comprising:
    a collar comprising:
        a collar fabric layer having at least one collar pouch affixed to an inner side thereof,
        at least one collar coolant sheet removably located within the at least one collar pouch,
        a collar fastener affixed to the collar fabric layer, and
        a vest connector, wherein the vest connector is a closed loop; and
    a vest comprising:
        a vest fabric layer having at least one vest pouch affixed to an inner side thereof,
        at least one vest coolant sheet removably located within the at least one vest pouch, wherein the at least one vest pouch holds the at least one vest coolant sheet against an underside of a torso of the animal,
        a collar connector affixed to the vest, wherein the collar connector removably extends through the vest connector to maintain the at least one vest coolant sheet against the underside of the torso,
        a vest insulation layer on the inner side of the vest fabric layer, the vest insulation layer extending between the vest fabric layer and the at least one vest pouch, and
        a vest fastener affixed to the vest fabric layer,
    wherein the collar is removably connected to the vest.

2. The system of claim 1, the collar further comprising a collar insulation layer on an outer side of the collar fabric layer opposite the at least one collar pouch.

3. The system of claim 1, the collar further comprising a collar insulation layer on an inner side of the collar fabric layer, the collar insulation layer extending between the collar fabric layer and the at least one collar pouch.

4. The system of claim 1, wherein the collar connector is located on an outer side of the vest fabric layer.

5. The system of claim 4, wherein the collar connector is an elastic strip of material covered with loops on a first side and having a connector hook fastener located at a distal end on the first side.

6. The system of claim 1, wherein the collar pouch has an open collar pouch end closed with a releasable pouch fastener.

7. The system of claim 1, wherein the collar fastener comprises a collar loop fastener attached to a first side and first end of the collar fabric layer, and a collar hook fastener attached to a second side and second end of the collar fabric layer.

8. The system of claim 1, wherein the at least one collar pouch comprises a plurality of collar pouches and the at least one collar coolant sheet comprises a plurality of collar coolant sheets.

9. The system of claim 1, wherein the at least one collar coolant sheet comprises a polymeric backing layer and a polymeric top layer forming cells of freezable coolant encapsulated in rows and columns.

10. The system of claim 1, the vest further comprising a vest insulation layer on an outer side of the vest fabric layer opposite the at least one vest pouch.

11. The system of claim 1, wherein the at least one vest pouch has an open vest pouch end closed with a releasable pouch fastener.

12. The system of claim 1, wherein the at least one vest pouch comprises a plurality of vest pouches and the at least one vest coolant sheet comprises a plurality of vest coolant sheets.

13. The system of claim 1, wherein the at least one vest coolant sheet comprises a polymeric backing layer and a polymeric top layer forming cells of freezable coolant encapsulated in rows and columns.

14. The system of claim 1, wherein the vest fastener comprises at least one vest loop fastener attached to a first side and first end of the vest fabric layer, and at least one vest hook fastener attached to a second side and second end of the vest fabric layer.

15. The system of claim 14, wherein the at least one vest loop fastener comprises a plurality of vest loop fasteners and the at least one vest hook fastener comprises a plurality of vest hook fasteners.

16. A vest apparatus for cooling a dog, comprising:
    a vest fabric layer having at least one vest pouch affixed to an inner side thereof;
    at least one vest coolant sheet removably located within the at least one vest pouch, wherein the at least one vest pouch holds the at least one vest coolant sheet against an underside of a torso of the animal;
    a vest insulation layer on the inner side of the vest fabric layer, the vest insulation layer extending between the vest fabric layer and the at least one vest pouch;
    a vest fastener affixed to the vest fabric layer; and
    a collar connector on an outer side of the vest fabric layer,
        wherein the collar connector is an elastic strip of material covered with loops on a first side and having a connector hook fastener located at a distal end on the first side,
        wherein the collar connector removably extends through a vest connector located on a collar apparatus.

* * * * *